J. W. Mulley. Sheet 1, 3 Sheets

Hand Raker.

No. 714. Reissued May 10, 1859.

N. PETERS, PHOTO-LITHOGRAPHER, WASHINGTON, D. C.

J. W. Mulley Sheet 2, 3 Sheets

Hand Raker.

No. 714. Reissued May 10, 1859.

N. PETERS, PHOTO-LITHOGRAPHER, WASHINGTON, D. C.

J. W. Mulley. Sheet 3, 3 Sheets.
Hand Raker.
No. 714. Reissued May 10, 1859.
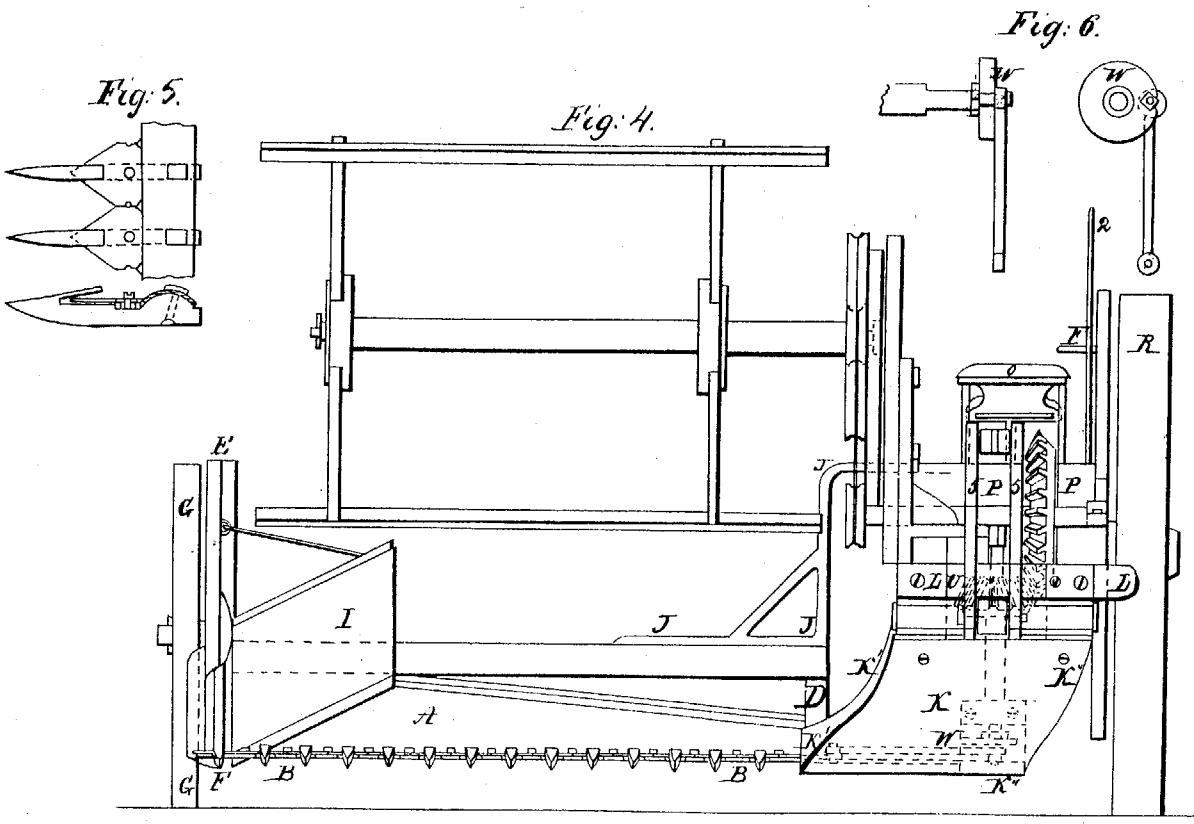
N. PETERS, PHOTO-LITHOGRAPHER, WASHINGTON, D. C.

UNITED STATES PATENT OFFICE.

J. W. MULLEY, OF AMSTERDAM, NEW YORK.

IMPROVEMENT IN MOWING AND REAPING MACHINES.

Specification forming part of Letters Patent No. 16,247, dated December 16, 1856; Reissue No. 714, dated May 10, 1859.

*To all whom it may concern:*

Be it known that I, J. W. MULLEY, of Amsterdam, in the county of Montgomery and State of New York, have invented certain new and useful Improvements in Grain and Grass Harvesters; and I do hereby declare that the following is a full, clear, and exact description of the same, reference being had to the annexed drawings, making a part of this specification, in which—

Figure 1:
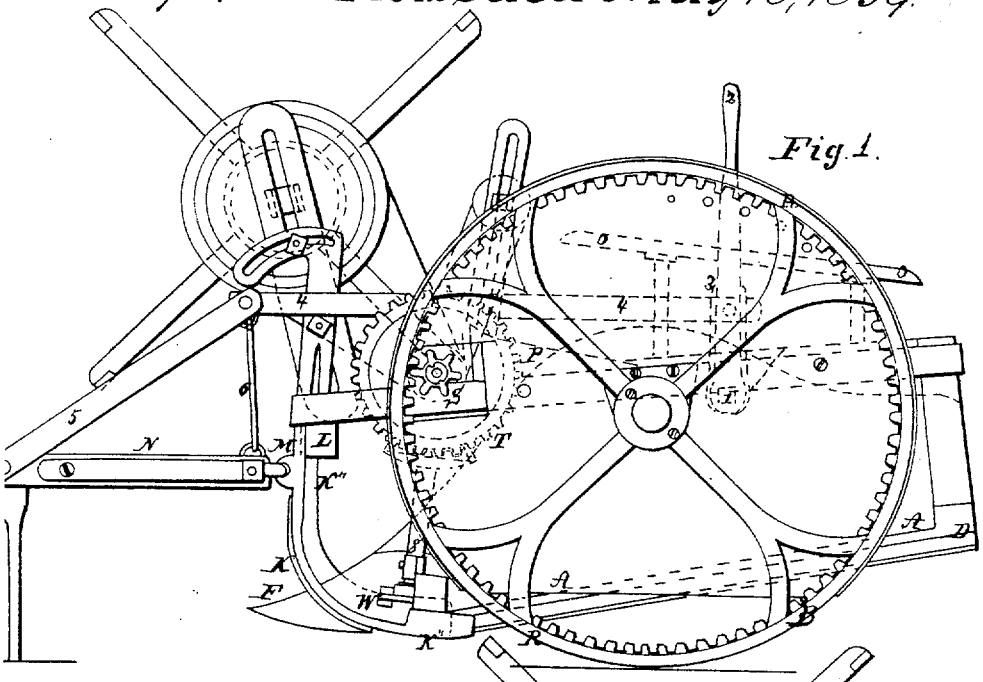
Figure 2:
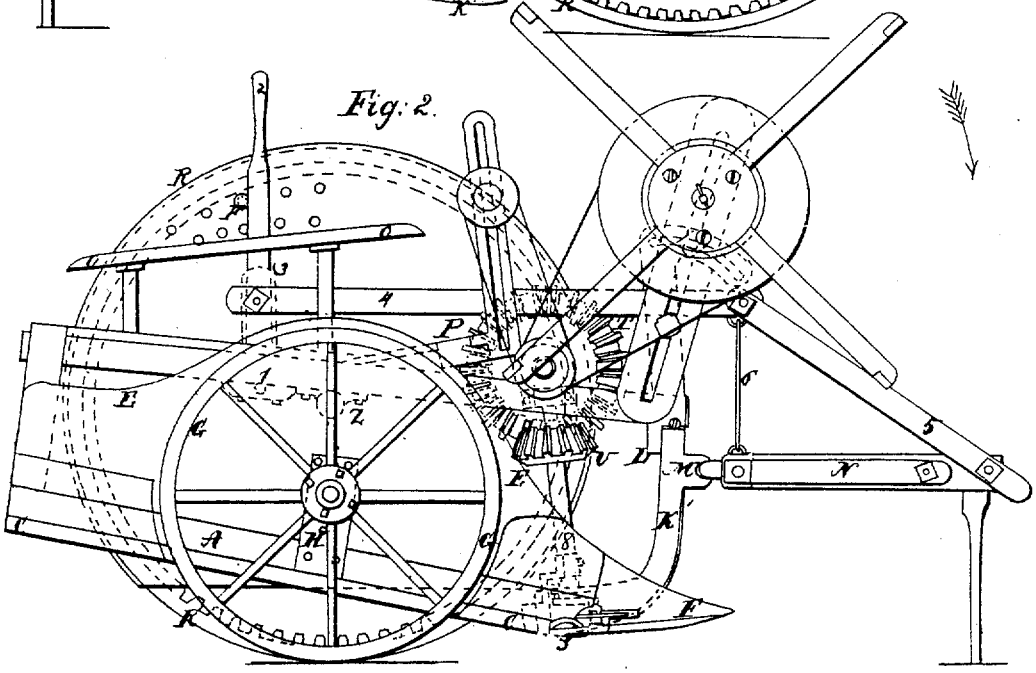
Figure 3:
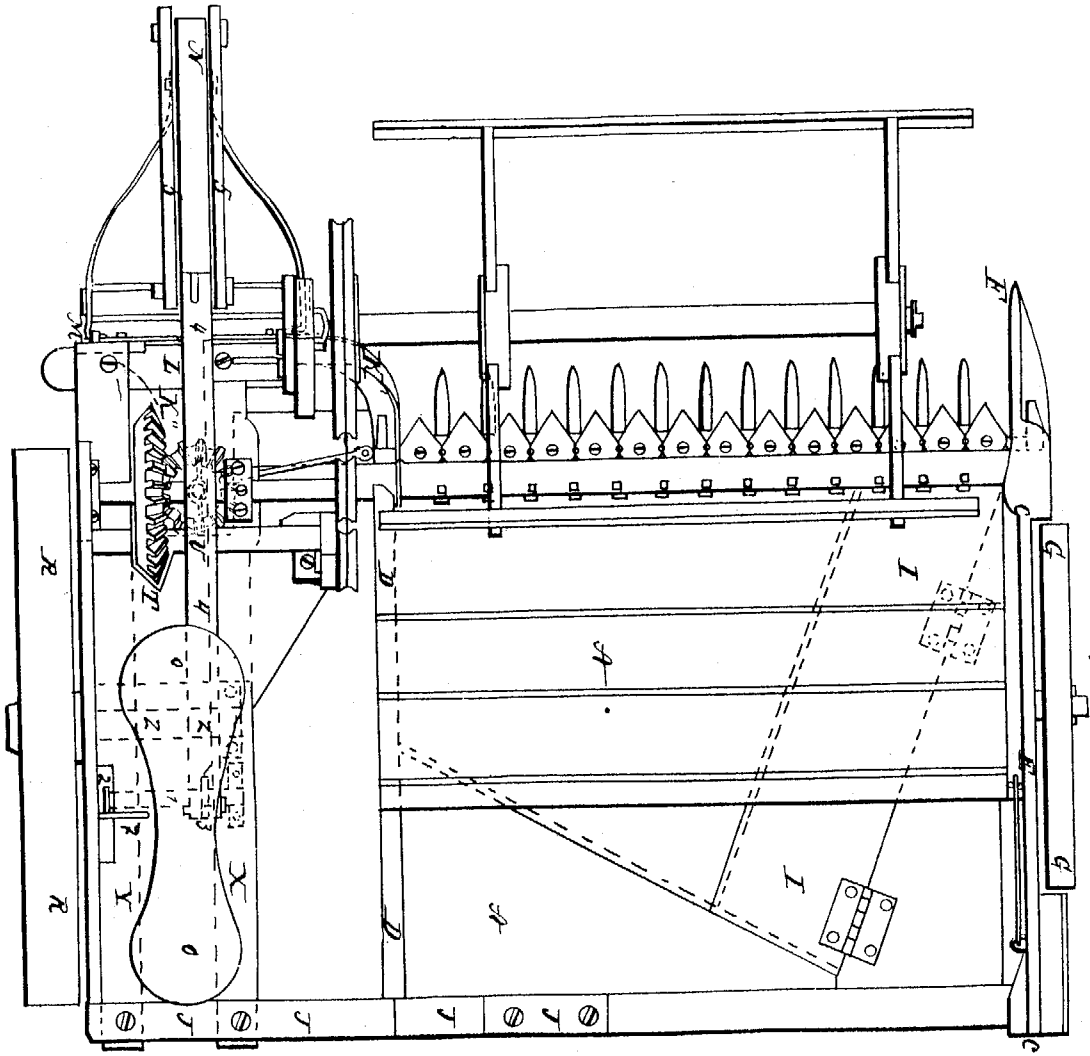

Figures 1 and 2 are side elevations of a harvester with my improvements applied to it. Fig. 3 is a plan view of the same. Fig. 4 is a front view of the same. Figs. 5 and 6 are views of certain detail parts.

The nature of my invention consists, first, in the peculiar mode of connecting the platform with the main frame of the harvester; also in the peculiar devices for elevating the cutters to any required height from the ground at any moment.

The invention further consists in the employment or use of a shoe, with its tongue attachment in front thereof, so constructed and arranged as to perform the functions hereinafter described.

To enable those skilled in the art to fully understand and construct my invention, I will proceed to describe it.

The platform A, upon which the cut grain falls and accumulates until it is raked off, is framed by three wooden beams and the finger-bar, which form a square parallelogram or a trapezium, as most suitable for the purpose, and according to the judgment of the constructer.

The finger-bar B is securely attached to the beams C and D. The draw-shoe and the dividing-finger are fastened to the beams in a permanent and suitable manner. The beam C, on the inner side of the platform, on the side nearest to the standing grain, carries a vertical board, E, which is so arranged as to form a continuation, or nearly such, with the upright portion of the dividing-finger F, and is so shaped as to form the guard of the supporting-wheel G, the axle of which does not revolve with the wheel, but is fixed and made of one piece with or otherwise permanently attached to a flat brace, H, which is bolted or screwed to the guard-board and beam supporting the said guard-board. This arrangement allows of a large diameter being given to the supporting-wheel, which will considerably lessen the side draft and give to the machine an easy seesaw motion when the cutters are to be elevated, in order to pass over any intervening obstacle. The guard-board E is furnished on both in and out side of the front portion—*i. e.*, near the cutters—with enlargements or bulbs, one of which clears the standing grain from becoming entangled with the supporting-wheel, while the other forms a continuous and flush surface with the adjustable track-clearer I, when the latter is set up in the manner and for the purpose hereinafter described.

The frame carrying the driver's and raker's seats is placed laterally on the outer side of the platform or on the side where the track is cleared. It is so arranged with regard to the platform that it will occupy an elevated position, leaving a gap or perpendicular space between itself and the platform. The means for securing the relative position consists in a double bent brace, J, placed at the rear, and the slanting draw-shoe K, placed in front of the machine. The draw-shoe is constructed in the following manner: Two braces made of wrought or cast iron, and bent to a double angle, so as to form the twist or curve required, are placed parallel with each other, their upper ends being attached to a cross-piece, L, while their lower ends are secured to the finger-bar and the beam D of the platform. The braces are covered in front by sheet-metal plate, which is intended to protect the cutter-guides, crank, disk, and pitman against the earth thrown up by the horses and the stray grain and grass that may enter and choke up these parts. The lower portion of the shoe-braces are differently constructed. The brace K″, or the outer brace, is connected with the extremity of the finger-bar, and carries above that joint a socket in which the circular disk or crank that imparts its movement to the cutters revolves. The top of this socket forms part of the vertical journal into which the crank-shaft is placed, and is held there by means of a brace which completes the journal. The other shoe-brace, K′, is attached to the side beam of the platform frame by means of a long iron strap that is screwed, bolted, or otherwise attached to both the said beam and the shoe-brace. The latter is furnished with two inclined ears or projections, producing a dovetail mortise and tenon joint with the finger-bar. The shoe-braces carry on their upper and front parts eyes M, into which the pole N is hinged, and is movable up and down within such limits as are determined by means of a device hereinafter described. The frame carrying the driver's and raker's seats is built of two pieces of timber laid parallel with the plane of the driving-wheel, and resting upon the cross-piece L on their front ends, and held up or otherwise connected with the rear brace, J, on the other ends. These two timbers carry the combined raker and driver's seat O, which is supported by two or more struts to keep it at a suitable elevation above the frame.

A foot-board, P, is placed in front of the driver's seat for convenience. The arrangement and disposition of the two pieces of timber are important, for they carry the driving-wheel and the whole machinery for the transmission of movement to the cutters, and also the apparatus for regulating the height of the cutter-frame from the ground. R is the wheel, having cast or otherwise secured to the inner side of its rim, or at any other diameter of the wheel, a set of cogs which mesh into and give motion to a spur-wheel, S, set on the extremity of a shaft which carries a bevel-wheel, T, gearing with a pinion, U, the shaft of which is placed normally to the internal surface of the draw-shoe, and works the disk W and cutters.

The different parts of the above-described machinery are so arranged that the lower end of the crank-shaft be in a continuous line with the cutter-bar, and that the disk, which is attached square with the said shaft, be in a plane parallel with the cutting-blades. The axle of the driving-wheel is fixed and revolves with the wheel in a cylindrical sleeve, *z*, attached to the under side of the two pieces of timber X and Y, and is thus protected against the entrance of straw or grain, which may produce choking or friction upon the axle and its bearings.

I have stated above that the tongue N is hinged to the draw-shoe and rotates freely between limits determined by means which constitute a new device for elevating the cutters from the ground. It is well known that a machine without some flexibility and yielding to the irregularities of the ground or to pass over any intervening obstacle—such as stumps, stones, &c.—would be quite imperfect, and I have bestowed considerable study to find ready and convenient means for controlling the inflection of the machine without requiring an extra amount of force and labor and without stopping the machine. I solved the problem, first, by arranging all the parts of the machine in such a manner that the weight of the machine shall be so balanced as to leave the necessary counterpoise in front of the machine for its proper operation; second, by placing beneath the combined raker and driver's seat, and immediately under the frame carrying the said seat, a rocking shaft, 1, leaving on one of its extremities a fixed lever, 2, that will describe a circle concentric with the shaft. The lever serves to rotate the shaft, which is also armed with a rocker or small lever, 3, so disposed that it shall move in one vertical plane with the tongue and give motion to a rod, 4, that is articulated to the rocker 3 on one end and to a double set of rails, 5, on the other end. The rails form a hinge-joint with the rod 4 and the tongue N. It will be perceived that when the distance from the junction of the rod N and rails 5 to the joint of the tongue and the draw-shoe at M is limited by connecting the same by a chain, cord, or its equivalent, 6, each of the joints will describe an arc of a circle of which M and 1 are the centers. The course of the lever 2 is limited by a pin, 7, that is set in one of the holes of the guard-board, which acts as a stop for the upward motion of the tongue.

In order to facilitate the explanation of the *modus operandi*, I will consider the machine in working order. The horses being attached to the machine, the pole is supported by them at a given height from the ground, and the lever 2 is inclined toward the rear or placed perpendicularly in the manner shown in the annexed drawings. Supposing an obstacle occur which has been cleared by the cutters, the driver then seizes the lever and moves it forward, which motion, being communicated to the rod 4 by the rocker 3, has a tendency to force the tongue downward toward the ground; but the tongue, being steadily supported by the horses and hinged at M, will cause the platform to be elevated in front by tipping over the wheels, thus clearing the obstacle. It will be perceived that by the above-described arrangement the raker, who is placed behind the driver, may also control the regulation of the height of the cutters, as he may reach with his foot the rocker and strike it at any required moment, causing the machine to elevate in front almost suddenly. This is very important. Obstacles may escape the attention of the driver, but may be discovered by the raker, who from his more elevated position and from the nature of the work he has to perform has a better opportunity to inspect the ground in front of the machine. The other parts of my improved grain and grass harvester I merely indicate so far as they have relation to the parts above described, as they form the subject of a separate application for Letters Patent.

The platform is divided into several parts, one of which is hinged to a triangular part thereof, nearest to the standing grain or grass, and is set up when the machine moves, and serves as a track-clearer. When the machine is used for reaping, the track-clearer is let down flush with the surface of the platform, and a grooved sheet-iron plate is placed in front to facilitate the raking operation. The finger-bar is made of sheet-iron, bent into a curved shape longitudinally, which gives great stiffness, strength, and lightness. The cutters are steel blades screwed to a cutter-bar, each by a single screw. The blades are laterally adjusted by rivets or pins, which are secured to the cutter-bar, and have for that purpose circular notches in the adjacent sides corresponding with each other. The reel for gathering the grain to the cutters has a hollow shaft, with a bearing on each end. It is set on an axle firmly attached at one end only to a slotted brace, which is made adjustable with guides in such a manner that it may be lowered, raised, advanced, or drawn back at pleasure, without the necessity of changing the belts or cords which transmit the movement.

From the above description it will be seen that the shoe K performs several functions. In the first place it serves as a means of connecting the front end of the main frame with the finger-bar, besides the legitimate office of a shoe, and it also serves as a protector or guard to the connecting-rod $a^{\times}$ of the cutter-bar $b^{\times}$, the shoe preventing the cut grass or grain from coming in contact with the connecting-rod $a^{\times}$ and circular disk or crank-pulley W. In this connection I would observe that for land or fields perfectly clear of stone the shoe may be constructed with an opening or hole in the rear or under portion thereof; but if the land or fields be stony I prefer to have it closed. The shoe is here shown as serving as a bearing for the inner end of the cuttter-bar $b^{\times}$—that is to say, the end of said bar which adjoins the main frame also as a support or bearing for the crank-pulley shaft. This shoe is a very important device as a protector or guard to the horizontal crank-pulley and its connecting-rod, which could not be successfully used in the same plane with the cutter-bar without being protected from the cut grain or grass. The revolutions of the crank-pulley, if exposed, would soon twist a mass of grain or grass around its shaft and connecting-rod, rendering the whole driving device inoperative.

It will be seen, further, from the above description, that the elevating device formed of the rods 4, rails 5, with the pole N, rocking shaft 3, and the lever 2 may be modified in various ways, and still the object be attained by substantially the same means. The important feature of this part of the invention is the forward movement of the lever 2 for the purpose of effecting the desired result. This forward movement of said lever admits of the driver applying his strength in the most advantageous manner, and also admits of a very simple mechanical arrangement for effecting the object.

Having now fully described my improvement, I wish it to be understood that I do not claim placing the platform lower than the wheel-frame. Neither do I claim the large driving-wheel in connection with an elevated main frame; but

What I claim, and desire to secure by Letters Patent, is—

1. Connecting the frame of the platform with the frame carrying the driver and raker's seat in the manner substantially as set forth—namely, securing the relative position of the two frames by means of the brace J in the rear and the laterally-inclined draw-shoe in front, when the above parts are constructed and arranged as described.

2. The shoe K, in combination with the tongue attachment in front thereof, the said shoe being constructed and arranged, substantially as described, to perform the functions as set forth herein.

3. The rod 4 and the rails 5, connected in the manner described, in combination with the pole N, the rocking shaft 3, and the lever 2, the whole being constructed, arranged, and operated in the manner specified, and for the purpose set forth.

4. The arrangement, in relation to the driver's seat, of the lever, and mechanism connected therewith for raising and lowering the cutter-bar, substantially as set forth herein, whereby the sickle may be raised in the manner described.

J. W. MULLEY.

Witnesses:
CHARLES P. WINEGAR,
BENJAMIN F. TRAVIS.